(12) United States Patent
Pellerin, III et al.

(10) Patent No.: US 9,514,061 B1
(45) Date of Patent: Dec. 6, 2016

(54) METHOD AND APPARATUS FOR CACHE TAG COMPRESSION

(71) Applicant: QUALCOMM Incorporated, San Diego, CA (US)

(72) Inventors: Henry Arthur Pellerin, III, Morrisville, NC (US); Thomas Philip Speier, Wake Forest, NC (US); Thomas Andrew Sartorius, Raleigh, NC (US); Michael William Morrow, Wilkes-Barre, PA (US); James Norris Dieffenderfer, Apex, NC (US); Kenneth Alan Dockser, Cary, NC (US); Michael Scott McIlvaine, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 9 days.

(21) Appl. No.: 14/716,947

(22) Filed: May 20, 2015

(51) Int. Cl.
   *G06F 12/00* (2006.01)
   *G06F 12/12* (2016.01)
   *G06F 12/08* (2016.01)

(52) U.S. Cl.
   CPC ......... *G06F 12/128* (2013.01); *G06F 12/0855* (2013.01); *G06F 12/0864* (2013.01); *G06F 12/0875* (2013.01); *G06F 2212/6032* (2013.04); *G06F 2212/621* (2013.01); *G06F 2212/69* (2013.01)

(58) Field of Classification Search
   CPC ............. G06F 12/128; G06F 12/0855; G06F 12/0864; G06F 12/0875; G06F 12/0895; G06F 2212/6032; G06F 2212/621; G06F 2212/69
   See application file for complete search history.

(56) References Cited

U.S. PATENT DOCUMENTS

| | | | |
|---|---|---|---|
| 6,795,897 B2 | 9/2004 | Benveniste et al. | |
| 7,162,669 B2 | 1/2007 | Gross | |
| 7,512,750 B2 | 3/2009 | Newburn et al. | |
| 8,627,041 B2 | 1/2014 | Glasco et al. | |
| 8,838,897 B2 | 9/2014 | Hu et al. | |
| 2013/0007358 A1* | 1/2013 | Hu ...................... | G06F 12/0846 711/108 |

OTHER PUBLICATIONS

International Search Report and Written Opinion—PCT/US2016/026664—ISA/EPO—Jun. 8, 2016.

* cited by examiner

*Primary Examiner* — Shawn X Gu
(74) *Attorney, Agent, or Firm* — Patterson & Sheridan, L.L.P.

(57) ABSTRACT

A memory structure compresses a portion of a memory tag using an indexed tag compression structure. A set of higher order bits of the memory tag may be stored in the indexed tag compression structure, where the set of higher order bits are identified by an index value. A tag array stores a set of lower order bits of the memory tag and the index value identifying the entry in the tag compression structure storing the set of higher order bits of the memory tag. The memory tag may comprise at least a portion of a memory address of a data element stored in a data array.

25 Claims, 6 Drawing Sheets

METHOD AND APPARATUS FOR CACHE TAG COMPRESSION

BACKGROUND

Aspects disclosed herein relate to the field of computer microprocessors (also referred to herein as processors). More specifically, aspects disclosed herein relate to cache tag compression.

Modern processors conventionally rely on caches to improve processing performance. Caches work by exploiting temporal and spatial locality in the instruction streams and data streams of the workload. A portion of the cache is dedicated to storing cache tag arrays. Cache tags store the address of the actual data fetched from the main memory. The speed of determining a hit or a miss in the cache is constrained by the width of the tag array, where larger tag arrays conventionally create more timing pressure. A wider (or larger) tag has more bits. To determine if there is a hit in the cache, all bits of the tag must be compared against the probe address. More bits in the comparison may therefore require more delay to return a result of the comparison.

SUMMARY

Aspects disclosed herein reduce the area required for tag storage by storing unique values of higher-order tag bits in a tag compression cache.

In one aspect, a cache memory comprises a tag compression structure and a tag array. The tag compression structure stores a plurality of tag compression entries. Each of the plurality of tag compression entries contains a respective set of higher order bits of a memory tag and are identified by a respective index value. The tag array stores a plurality of tag array entries. Each of the plurality of tag array entries contains a respective set of lower order bits of the memory tag and an index value corresponding to one of the index values of the tag compression structure. The first memory tag may comprise at least a portion of a memory address of a data element stored in a data array.

In one aspect, a method comprises storing, in a first tag compression entry of a plurality of tag compression entries in a tag compression structure, a set of higher order bits of a first memory tag. Each of the plurality of tag compression entries are identified by a respective index value. The method further comprises storing, in a first tag array entry of a plurality of tag array entries in a tag array, a set of lower order bits of the memory tag and an index value for the first tag array entry. The index value of the first tag array entry corresponds to the first tag compression entry in the tag compression structure. The first memory tag may comprise at least a portion of a memory address of a data element stored in a data array.

In one aspect, a non-transitory computer-readable medium stores instructions that, when executed by a processor, cause the processor to perform an operation comprising storing, in a first tag compression entry of a plurality of tag compression entries in a tag compression structure, a set of higher order bits of a first memory tag. Each of the plurality of tag compression entries are identified by a respective index value. The operation further comprises storing, in a first tag array entry of a plurality of tag array entries in a tag array, a set of lower order bits of the memory tag and an index value for the first tag array entry. The index value of the first tag array entry corresponds to the first tag compression entry in the tag compression structure. The first memory tag may comprise at least a portion of a memory address of a data element stored in a data array.

In one aspect, an apparatus comprises means for storing, in a first tag compression entry of a plurality of tag compression entries, a set of higher order bits of a first memory tag. Each of the plurality of tag compression entries are identified by a respective index value. The apparatus further comprises means for storing, in a first tag array entry of a plurality of tag array entries, a set of lower order bits of the memory tag and an index value for the first tag array entry. The index value of the first tag array entry corresponds to the first tag compression entry. The first memory tag may comprise at least a portion of a memory address of a data element.

By storing a portion of a memory tag in a tag compression cache, aspects disclosed herein reduce the storage of redundant bits in the tag array. Doing so requires less physical area for memory tags, provides faster comparison results, and requires less power to perform a comparison.

BRIEF DESCRIPTION OF THE SEVERAL VIEWS OF THE DRAWINGS

So that the manner in which the above recited aspects are attained and can be understood in detail, a more particular description of aspects of the disclosure, briefly summarized above, may be had by reference to the appended drawings.

It is to be noted, however, that the appended drawings illustrate only aspects of this disclosure and are therefore not to be considered limiting of its scope, for the disclosure may admit to other aspects.

DETAILED DESCRIPTION

Aspects disclosed herein provide techniques to reduce the area for memory tag storage. For example, caches may be tagged with some set of upper address bits. Generally, cache tags require storage for a large number of bits, and modern cache architectures conventionally require substantially larger tags than previous generations. For example, consider a hypothetical 4-way 32 kilobyte (KB) instruction cache that has 64 bit lines. The number of lines of such a cache is $2^{15}/2^9$, or 512 lines. Each line is associated with a tag. The number of sets of the cache is equal to $2^{15}/2^6/2^2$, or 128 sets (with a 7-bit set decode). In at least one aspect, the tag bits do not include the 7-bit set decode or 6-bit byte-offset, meaning the tag bits start at A[7+6], or A[13], where "A" indicates address input to the tag search. Therefore, for an example address of 64 bits, the tag is compared against A[63:13], and the tag storage is 51 bits per line. The total tag storage for the cache is therefore 51 bits/line*512 lines, or 26,112 bits, resulting in a storage overhead of 10% for storing the cache tags.

Although the tag values are arbitrary and code-dependent, a subset of the bits of each of the tag values may have little variability, such that the subset of bits has the same values across multiple cache tags. Aspects disclosed herein exploit this tendency by eliminating redundant storage of multiple copies of the same value across multiple cache tags. Specifically, aspects disclosed herein introduce a tag compression cache that is configured to store unique tag values. Doing so removes a number of bits from the cache tag. The bits that are removed from the cache tag may be replaced with a smaller number of bits that point to a tag compression cache entry. The tag compression cache may hold any set of bits from the cache tag, which include, without limitation, upper (or higher) address bits, address space identifiers (ASID), security bits, exception level bits, and the like.

Since the tag compression cache holds a portion of the original cache tag, an access must "hit" in the tag compression cache in order to "hit" in the cache. Similarly, an access that "misses" in the tag compression cache must also "miss" in the cache itself. Evicting a tag compression cache entry requires invalidation of all corresponding cache lines (namely, those lines having a tag compression cache index value matching the index of the tag compression cache being evicted). However, invalidating a cache line does not require any updates to the tag compression cache.

Aspects disclosed herein access the tag compression cache and the cache in parallel to determine if an input memory address results in a cache "hit" or "miss." Specifically, aspects disclosed herein access the tag compression cache using a set of higher order bits of the input memory address. If there is a hit in the tag compression cache (i.e., an entry in the tag compression cache matches the higher order bits of the input memory address), the tag compression cache is configured to return the index value of matching entry. In parallel, aspects disclosed herein search the cache using a set of lower order bits of the input memory address. If there is a hit in the cache (i.e., a tag entry in the cache tag array matches the lower order bits of the input memory address), the cache is configured to return the lower order bits and the index value in the matching entry. Aspects disclosed herein may then compare the index values returned from the cache and the tag compression cache. If the index values do not match, aspects disclosed herein return an indication of a cache miss. Aspects disclosed herein may further compare the lower bits returned from the cache tag entry to the lower bits of the input memory address. If the lower bits do not match, aspects disclosed herein return an indication of a cache miss. However, if the index values match and the lower bits match, aspects disclosed herein return an indication of a cache hit (i.e., the requested data is present in the cache).

A cache is used herein as a reference example to facilitate description of aspects of the disclosure. However, the use of a cache should not be considered limiting of the disclosure, as the techniques described herein apply to other hardware structures that have tag fields, such as processor caches, data caches, instruction caches, line fill buffers, translation lookaside buffers (TLB), and the like. Any reference to a particular hardware structure should not be considered limiting of the disclosure.

Figure 1:
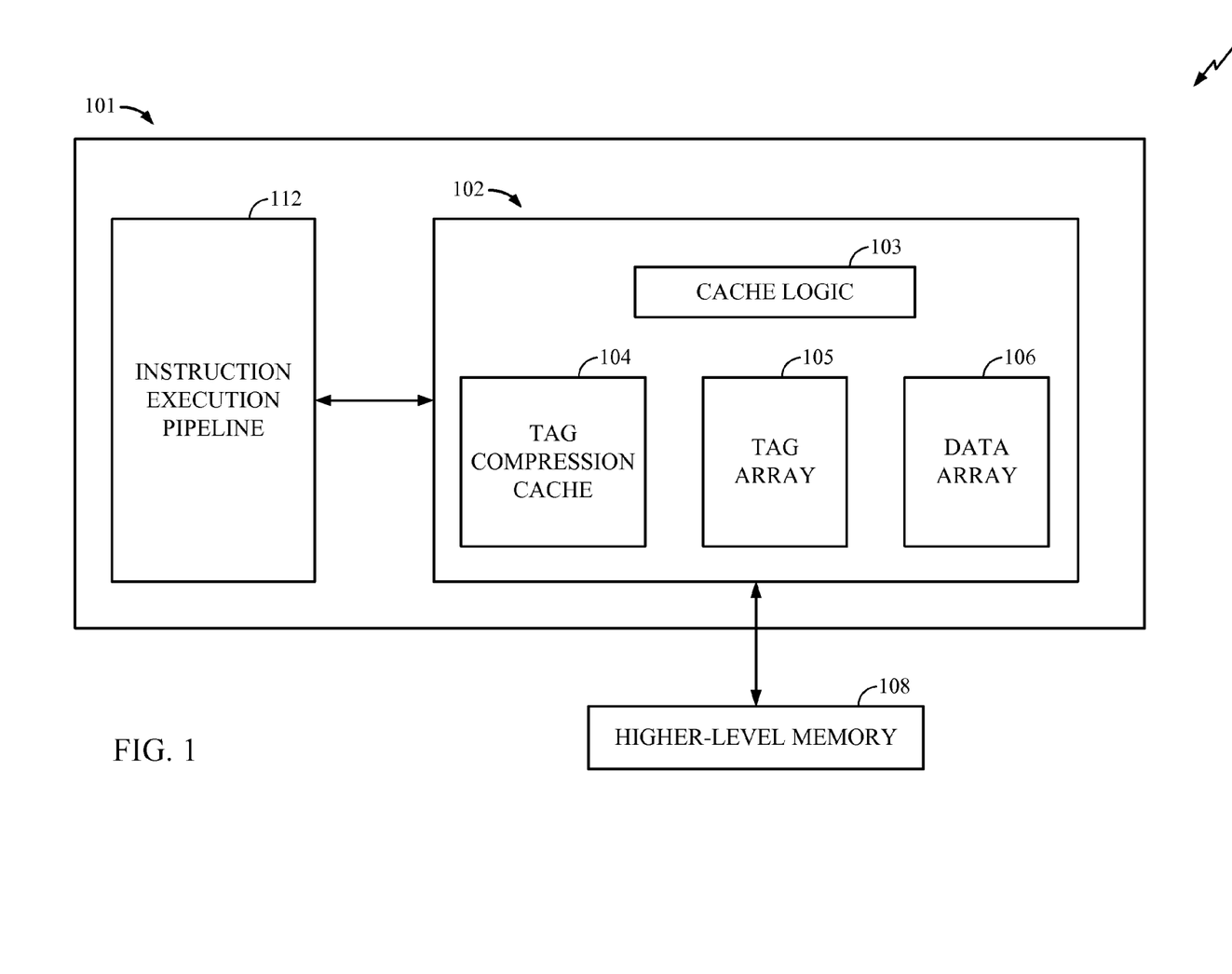
FIG. 1 illustrates a processor which provides cache tag compression, according to one aspect.
Figure 2:
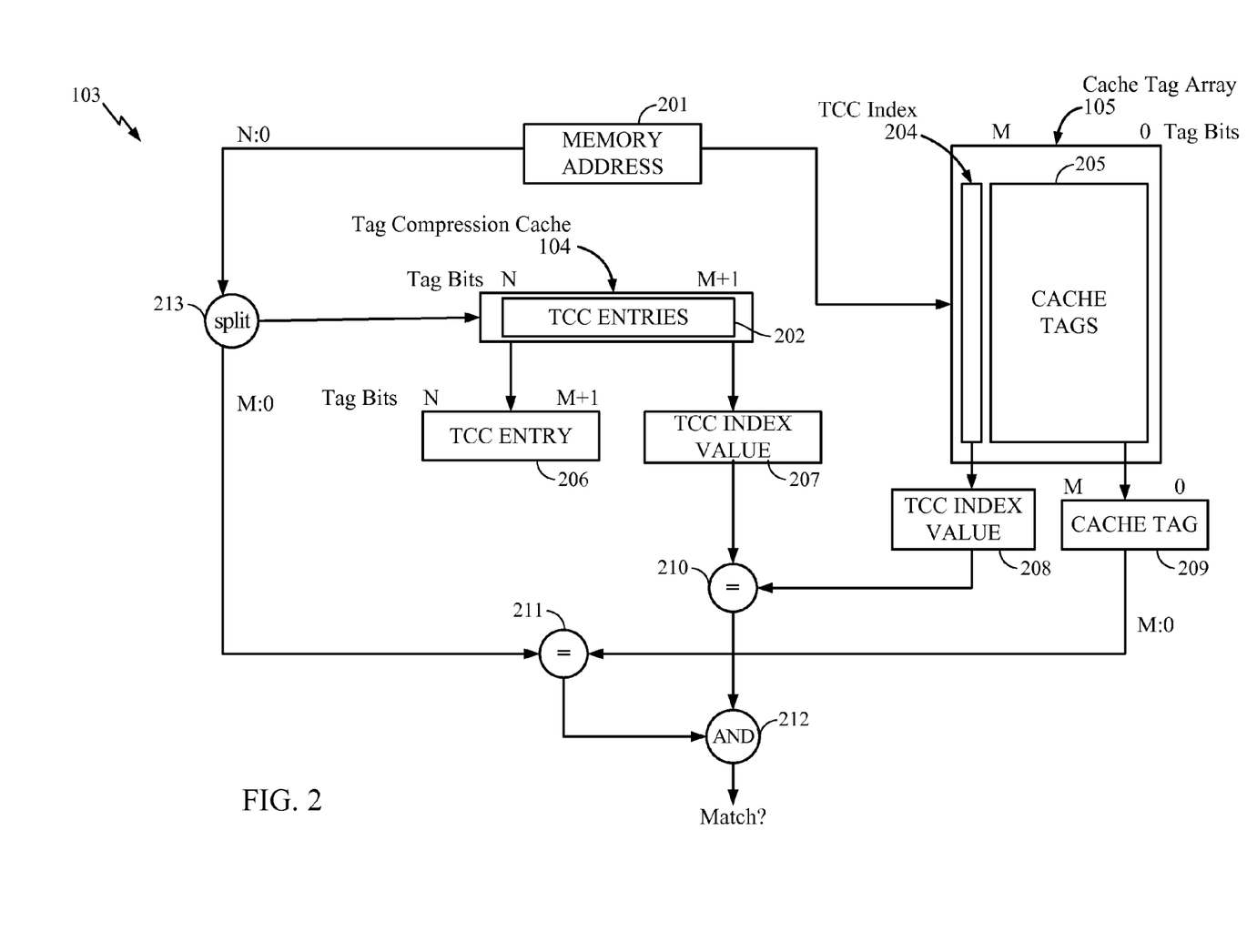
FIG. 2 is a logical view of components of a processor configured to provide cache tag compression, according to one aspect.

FIG. 1 illustrates a processor 101 that provides cache tag compression, according to one aspect. As shown, the processor 101 includes an instruction execution pipeline 112 which executes instructions. The pipeline 112 may be a superscalar design, with multiple parallel pipelines, each of which includes various non-architected registers (not pictured), and one or more arithmetic logic units (also not pictured). As shown, the processor 101 also includes a cache 102 (also referred to as a cache memory 102), which stores lines of data from one or more higher levels of memory 108. The higher levels of memory 108 may include, without limitation, higher level caches and/or main (system) memory. In at least one aspect, the cache 102 is a Level 1 (L1) data cache. Generally, the CPU 101 may include numerous variations, and the CPU 101 shown in FIG. 2 is for illustrative purposes and should not be considered limiting of the disclosure. For example, the CPU 101 may be a graphics processing unit (GPU).

As shown, the cache 102 includes cache logic 103, a tag compression cache 104, a tag array 105, and a data array 106. The cache logic 103 generally controls operation of the cache 102, such as determining whether cache hits or misses occur in a particular operation. The tag compression cache (TCC) 104 is a hardware structure configured to hold a set of upper (or higher) order bits of memory tags. For example, the TCC 104 may hold one or more of the upper address bits of the memory tag, ASID bits, security bits, exception level bits, and the like. The TCC 104 is generally configured to store redundant values that would otherwise be redundantly stored in the tag array 105. The tag array 105 is generally configured to store the addresses of data stored in the cache 102. More specifically, each entry of the tag array 105 is configured to store a set of lower order bits of memory tags and an index value which corresponds to the index value of an entry in the TCC 104. The data array 106 stores the data of the cache lines. In at least one aspect, the TCC 104 is implemented as a content addressable memory (CAM) structure. Similarly, the tag array 105 and data array 106 may be implemented as a CAM. Furthermore, in at least one aspect, the TCC 104 is a fully-associative, least recently used (LRU) replacement structure. The TCC 104 may have any number of entries, such as two, four, or eight. Means for storing data in the TCC 104, tag array 105, and data array 106 may include one or more memory cells.

In operation, the processor 101 may seek to determine whether data located in one of the higher levels of memory 108 is present within the cache 102. When the processor 101 provides an input memory address (which may be a virtual address) to the cache 102, the cache logic 103 may determine whether the data at the input memory address is in the cache 102. To do so, the cache logic 103 may initiate a CAM search of the TCC 104 using the higher order bits of the input memory address. If an entry in the TCC 104 matches higher order bits of the input memory address, the TCC 104 is configured to return the index value of the matching entry in the TCC 104. The cache logic 103 may initiate a CAM search of the tag array 105 in parallel with the CAM search of the TCC 104. The cache logic 103 may search the tag array 105 using the lower order bits of the input memory address. If the lower order bits of an entry in the tag array 105 match the lower order bits of the input memory address, the tag array 105 is configured to return the lower order bits and the index value of the matching entry. The cache logic 103 may then compare the index value returned by the TCC 104 and the tag array 105. If the index values do not match, the cache logic 103 may return an indication of a cache miss. The cache logic 103 may also compare the lower order bits returned by the tag array 105 to the lower order bits of the input memory address. If the lower order bits match, and the index values match, the cache logic 103 is configured to return an indication of a cache hit.

If the search of the TCC 104 results in a miss, the cache logic 103 may be configured to create an entry for the input memory address in the TCC 104. If a free (or otherwise available) entry exists in the TCC 104, the cache logic 103 may store a set of higher order bits of the input memory address to the free entry. If no entries are available in the TCC 104, the cache logic 103 may evict an existing entry in the TCC 104, and invalidate any corresponding entries in the tag array 105 (and data array 106) that specify the index value of the evicted entry. The cache logic 103 may apply any suitable replacement policy for the TCC 104, such as LRU, or replacing the TCC 104 entry that is associated with the fewest cache lines (which may be determined by a counter for each entry in the TCC 104). The cache logic 103 may invalidate the entries in any feasible manner, such as by a flash invalidation or a line by line invalidation. In addition to adding an entry specifying the higher order bits of the input memory address to the TCC 104, the cache logic 103 may also create an entry in the tag array 105 that specifies the lower order bits of the input memory address and an index value of the TCC 104 entry storing the higher order bits of the input memory address.

In at least one aspect, the cache logic 103 may probe the TCC 104 every clock cycle. However, this may draw large amounts of power, and may be in the critical timing path. The more entries that are built into the TCC 104, the more power and time may be required to probe the TCC 104. Therefore, in some aspects, the cache logic 103 may include logic that avoids the need to search the TCC 104 in a majority of cycles. For example, a set of registers may be configured to store the bits returned by a previous access to the TCC 104 (and whether the corresponding TCC 104 entry remains valid). Generally, the cache logic 103 may determine whether the input memory address bits corresponding to those that are held in the TCC 104 are the same as in the previous access to the TCC 104. The cache logic 103 may then determine whether the associated TCC 104 entry has not been invalidated since the last access. If both determinations are true, the cache logic 103 may determine that the compression cache tag must be in the TCC 104, and that it is safe to reuse the previous cycle's index, rendering it unnecessary to search the TCC 104 in the current cycle. If either determination is not true, the cache logic 103 cannot reuse the TCC 104 index of the previous cycle, the control logic 103 must search the TCC 104. Means for searching the TCC 104, the tag array 105, and the data array 106 include logic implemented as hardware and/or software. Similarly, the logic implemented as hardware and/or software may serve as means for reading and/or writing values, returning indications of hits and/or misses, and returning values from the TCC 104, the tag array 105, and the data array 106. Example of such means logic includes memory controllers, cache controllers, and data controllers.

As previously indicated, the compression scheme depicted in FIG. 1 may be applied to other PC-tagged and/or ASID-tagged microarchitectural structures. For example, a virtual address may be transformed into the form {tag compression index value, partial virtual address}, which may be used throughout the block. Doing so would allow all data-path elements to operate on this shortened form, including a translation lookaside buffer (TLB), branch predictors, breakpoints, caches, and the like. If necessary, the transformed address could be converted into the original address whenever necessary, such as at block boundaries, for cache-content debug facilities, and the like. Similarly, the tag compression technique may be applied independently to instruction addresses, load/store addresses, and physically tagged structures.

In one aspect, the processor 101 is disposed on an integrated circuit including the instruction execution pipeline 112 and the cache 102. In another aspect, the cache 102 may be located on a separate integrated circuit from an integrated circuit including the processor 101.

FIG. 2 is a logical view of a portion of a cache logic 103 of a processor 101 configured to provide cache tag compression, according to one aspect. As shown, the processor 101 includes the tag compression cache (TCC) 104 and the cache tag array 105. As previously described, the TCC 104 is an indexed hardware structure storing a plurality of TCC entries 202. The TCC entries 202 may include a set of higher order address bits of a memory tag. In at least some aspects, the TCC entries 202 may further include bits related to ASIDs, security levels, exception levels, and the like. As shown, the cache tag array 105 includes a plurality of entries, each of the entries having a tag compression cache (TCC) index value 204 and a cache tag 205. The TCC index value 204 may correspond to the index value of an entry 202 in the TCC 104. The cache tags 205 may include the lower order bits of a memory tag. As shown, the cache tags 205 store the lower order bits of the memory tag, namely bits 0 through M of an N-bit memory tag. Similarly, the TCC 104 stores the higher order bits of the N-bit memory tag, namely bits M+1 through N of the memory tag. Therefore, a complete memory tag (bits 0 through N) may be produced by combining the higher order bits stored in the TCC 104 (bits M+1 through N) with the lower order bits of the cache tag 205 (bits 0 through M).

As shown, the processor 101 may request data stored at a memory address 201. The cache logic 103 may be configured to determine whether the data stored at the memory address 201 is located in the cache 102. In at least one aspect, the memory address 201 may be a virtual memory address having a length of N bits. To determine whether the data stored at the memory address 201 is in the cache 102, the cache logic 103 may probe the TCC 104 and the cache tag array 105 in parallel. More specifically, as shown, the cache logic 103 may perform a CAM search of the cache tag array 105. If one of the cache tags 205 includes an entry which matches bits 0 through M of the memory address 201, the cache tag array 105 may return a TCC index value 208 and a cache tag 209. Furthermore, as shown, a splitter 213 may split the memory address 201, which provides bits M+1 through N of the memory address 201 to the TCC 104. A CAM search on the TCC 104 may be performed using the bits M+1 through N of the memory address 201. If an entry 202 in the TCC 104 includes a value that matches the value of the bits M+1 through N of the memory address 201, the TCC 104 is configured to return a TCC entry 206 and a TCC index value 207, where the index value 207 identifies the matching TCC entry 206. The TCC index value 207 may be any number of bits in length suitable to allow each entry 202 in the TCC 104 to be uniquely identified by a respective TCC index value 207. Therefore, for example, if the TCC 104 had four hardware entries (e.g., four TCC entries 202), the TCC index value 207 corresponding to each entry may be two bits in length. In such an example, each TCC index 204 stored in the cache tag array 105 would also be two bits in length. In at least one aspect, the TCC index values 207 are implicitly identified based on the location (or address) of a given TCC entry 202.

As shown, a comparator 210 compares the TCC index value 207 returned from the TCC 104 to the TCC index value 208 returned by the cache tag array 105. Furthermore, a comparator 211 compares the lower order bits 0:M of the memory address 201 to the lower order bits 0:M stored in a cache tag entry 209 returned from the cache tag array 105. As shown, the AND logic 212 is configured to perform a logical AND operation on the outputs of the comparators 210, 211. If both comparators 210, 211 indicate a match, then the output of the AND logic 212 is configured to return an indication of a cache hit. Stated differently, if the index values compared by the comparator 210 match, and the lower order bits 0:M compared by the comparator 211 match, then the contents of the requested memory address 201 are stored in the cache 102, and the cache logic 103 may return an indication of a cache hit. However, if the comparator 210 indicates that the compared index values do not mach, or the comparator 211 indicates the lower order bits 0:M do not match, the requested data is not in the cache 102, and the cache logic 103 may return an indication of a cache miss. Therefore, as shown, the cache logic 103 causes a comparison of bits 0:M and index values. Doing so allows the cache logic 103 to compare fewer bits than a traditional tag compare (of bits 0:N), resulting in a faster comparison than the traditional compare.

In the event of a cache miss, the cache logic 103 may be configured to fetch the requested data from a higher order memory, and populate the TCC 104 and the cache tag array 105 as described above. Similarly, if either of the initial CAM searches of the TCC 104 and the cache tag array 105 miss, the cache logic 103 may be configured to fetch the requested data from a higher order memory, and populate the TCC 104 and the cache tag array 105 as described above.

Figure 3:
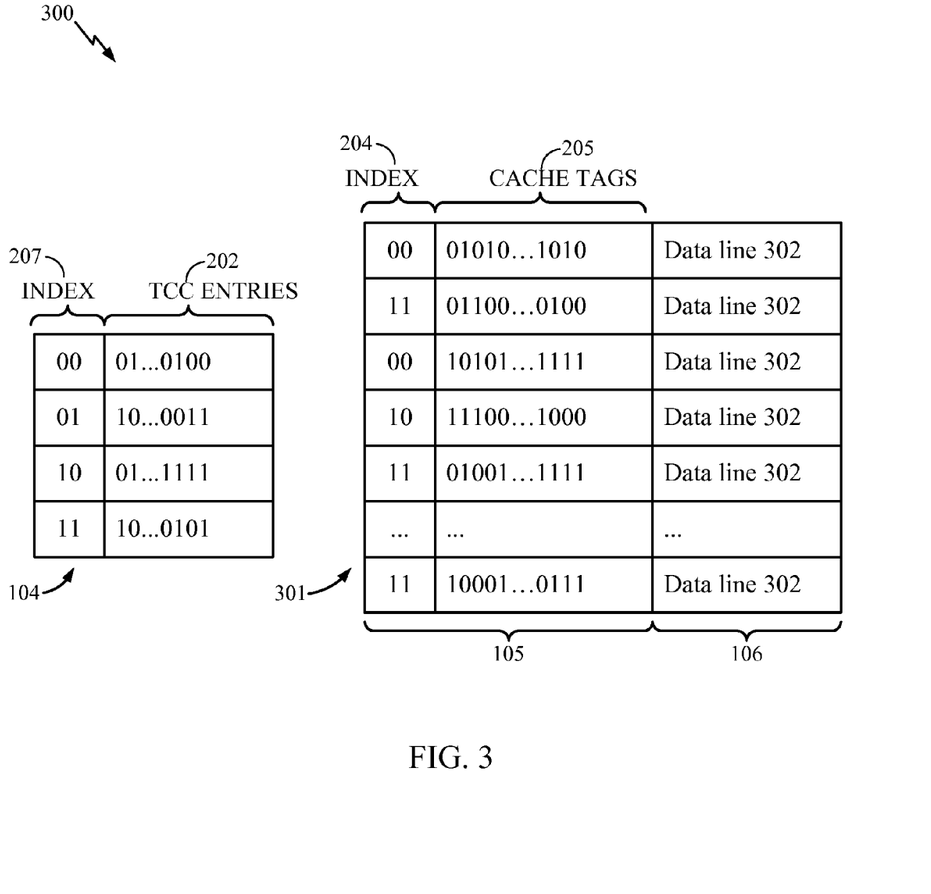
FIG. 3 is a schematic illustrating example values stored in a tag compression cache, tag array, and data array, according to one aspect.

FIG. 3 is a schematic 300 illustrating example values stored in the tag compression cache (TCC) 104, the cache tag array 105, and the data array 106, according to one aspect. As shown, each TCC entry 202 in the TCC 104 specifies a portion of a memory tag and is identified by a respective TCC index value 207. The respective index values 207 uniquely identify each TCC entry 202. In at least one aspect, the index value 207 is implicitly provided by the location (or address) of each entry in the TCC 104. In such aspects, therefore, the index value 207 is not expressly defined in the TCC 104, and the index values 207 are depicted in FIG. 3 to facilitate explanation of such aspects. The tag portion of each TCC entry 202 may be the higher order address bits of a memory tag, and may include additional information, such as ASID bits, security bits, exception level bits, and the like.

As shown, the table 301 includes example values of the cache tag array 105 and the data array 106. The data array 106 stores a data line 302 for each entry in the cache 102. The cache tag array 105, as previously described, includes index values 204 and cache tags 205. The index values 204 in the cache tag array 105 correspond to the index value 207 corresponding to a given TCC entry 202 in the TCC 104, while each corresponding cache tag 205 stores the lower order bits of a memory tag. Therefore, as shown, multiple entries in the table 301 may store the same index values 204. Advantageously, the TCC 104 stores a single copy of the full bit pattern of higher order bits of the memory tag, reducing the amount of redundant information stored in the cache tag array 105 (namely the different index values 204, and not the lengthier higher order bits of the memory tag). Therefore, a memory tag is stored across the TCC 104 and the cache tag array 105, with the higher order bits stored in the TCC 104, and the lower order bits stored in the cache tag array 105. Conceptually speaking, the tag portion of the TCC entry 202 in the TCC 104 may replace the index value 204 of the cache tag array 105 to produce a complete memory tag. For example, in the first row of the table 301, the bits "00" of the index 204 would be replaced by the tag bits "01 . . . 0100" of the TCC entry 202 corresponding to the index value 207 of "00" in the TCC 104.

In one example aspect, the configuration depicted in FIG. 3 may replace a hypothetical instruction cache with an example organization depicted in Table I:

TABLE I

| Line size | 64 Bytes |
| Associativity | 4-way |
| Number of sets | 128 |
| Total number of lines | 512 |
| Nominal capacity | 32 KB |
| Address width | 49 bits |
| Set Index | Virtual Address (7 bits) |
| Number of tag bits (per line) | {Virtual Address, ASID} (36 + 16 = 52 bits) |
| Number of tag bits (total) | (52 bits per line * 512 lines) = 26,624 bits |

Therefore, as shown in Table 1, the hypothetical instruction cache requires 26,624 bits of storage overhead for tag storage, of the total cache storage of 32 KB (or 32,768 Bytes, or 262,144 bits). The instruction cache tag required in this example configuration would be {PC[48:13], ASID}.

However, a subset of these bits (such as {PC[48:28], ASID}) tend to show little variability in real-world workloads. By creating a four-entry TCC 104 for this example instruction cache, each TCC entry 202 would store the 21 PC[48:28] bits and the 16 bits of the ASID, for a total of 37 bits. The total amount of storage required for the TCC 104 would therefore be 4 entries times 37 bits, or 148 bits. The TCC entries 202 may be implicitly indexed by the location (or address) of each respective TCC entry 202 in the TCC 104 (for example, in the four-entry TCC 104, locations 0, 1, 2, and 3 correspond to binary index values of 00, 01, 10, and 11, respectively). Meanwhile, the indexes 204 of the cache tag array 105 would store the two-bit index values, while the cache tags 205 would store the tag bits PC[27:13], or 15 bits, for a total of 17 bits. Across the 512 lines of the instruction cache, the total storage in the cache tag array 105 would be 512 entries, times 17 bits, for a total of 8,704 bits. The total storage required across the TCC 104 and the cache tag array 105 would be 8,852 bits (148+8,704), which is significantly less than the 26,624 bits required by the instruction cache described in Table I.

Figure 4:
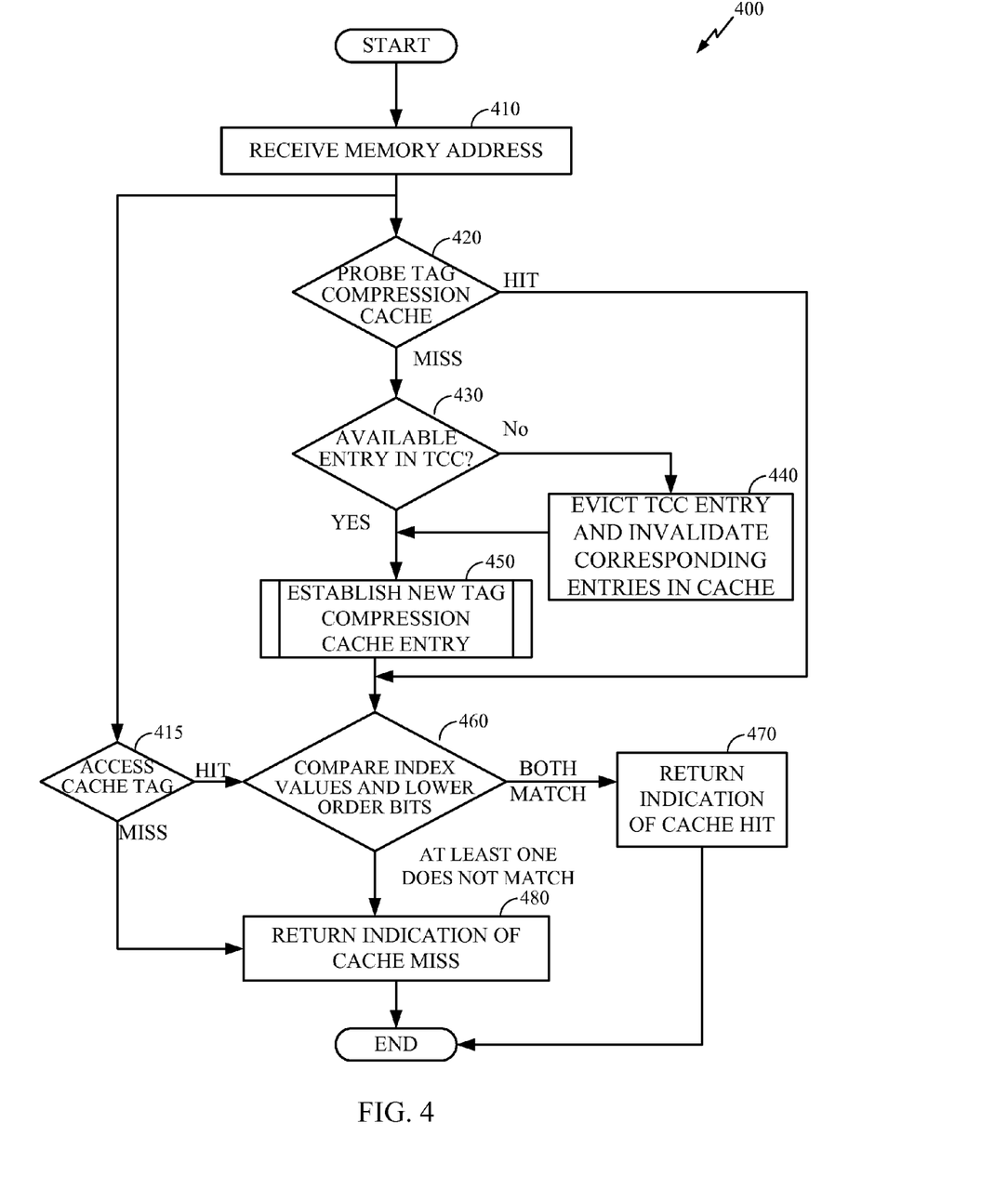
FIG. 4 is a flow chart illustrating a method to provide cache tag compression, according to one aspect.

FIG. 4 is a flow chart illustrating a method 400 to provide cache tag compression, according to one aspect. The method 400 begins at step 410, where the cache logic 103 may receive a memory address of N bits in length. The memory address may be received as part of a request to determine whether the data stored at the memory address is located in the cache 102. The cache logic 103 may then probe the TCC 104 and the cache tag array 105 in parallel. More specifically, at step 415, the cache logic 103 may perform a CAM search on the cache tag array 105 using lower M bits of the memory address received at step 410. If an entry in the cache tag array 105 stores a value matching the lower M bits of the memory address, there is a hit in the cache tag array 105, and the method proceeds to step 460. In addition, the cache tag array 105 may return the lower M bits of the memory address and the index value stored in the matching entry. If there is no entry in the cache tag array 105 storing a value matching the lower M bits of the memory address, there is a miss in the cache tag array 105, and the method proceeds to step 480.

At step 420, the cache logic 103 may probe the TCC 104 using the higher order bits (M+1 through N) of the requested memory address. If an entry in the TCC 104 stores a value matching the higher order bits of the requested memory address, the method proceeds to step 460. In the event of a hit in the TCC 104, the TCC 104 may return the index value of the entry in the TCC 104 that matches the higher order bits of the memory address. If there is a miss in the TCC 104, the method proceeds to step 430, where the cache logic 103 may determine whether available entries exist in the TCC 104. If an entry is not available, the method proceeds to step 440, where the cache logic 103 may evict an entry in the TCC 104 and invalidate any corresponding entries in the cache tag array 105. The cache logic 103 may use any suitable eviction policy, such as evicting the least recently used entry, or evicting the entry in the TCC 104 that is associated with the fewest entries in the cache tag array 105. The cache logic 103 may invalidate the entries in the cache tag array 105 in any feasible manner, such as by a flash invalidation or a line by line invalidation. At step 450, described in greater detail with reference to FIG. 5, the cache logic 103 may establish a new entry in the TCC 104. Generally, the cache logic 103 may split the memory address into a lower set of bits 0:M and a higher set of bits M+1:N. The cache logic 103 may then store the lower set of bits in the cache tag array 105, and store the higher set of bits in the TCC 104.

At step 460, the cache logic 103 may compare the index values returned by the TCC 104 and the cache tag array 105. The cache logic 103 may further compare the lower order bits returned by the cache tag array 105 to the lower order bits of the requested memory address. If both comparisons result in a match, the method proceeds to step 470, where the cache logic may return an indication of a cache hit. If one (or both) of the comparisons performed at step 460 do not result in a match, the method proceeds to step 480, where the cache logic 103 returns an indication of a cache miss.

Figure 5:
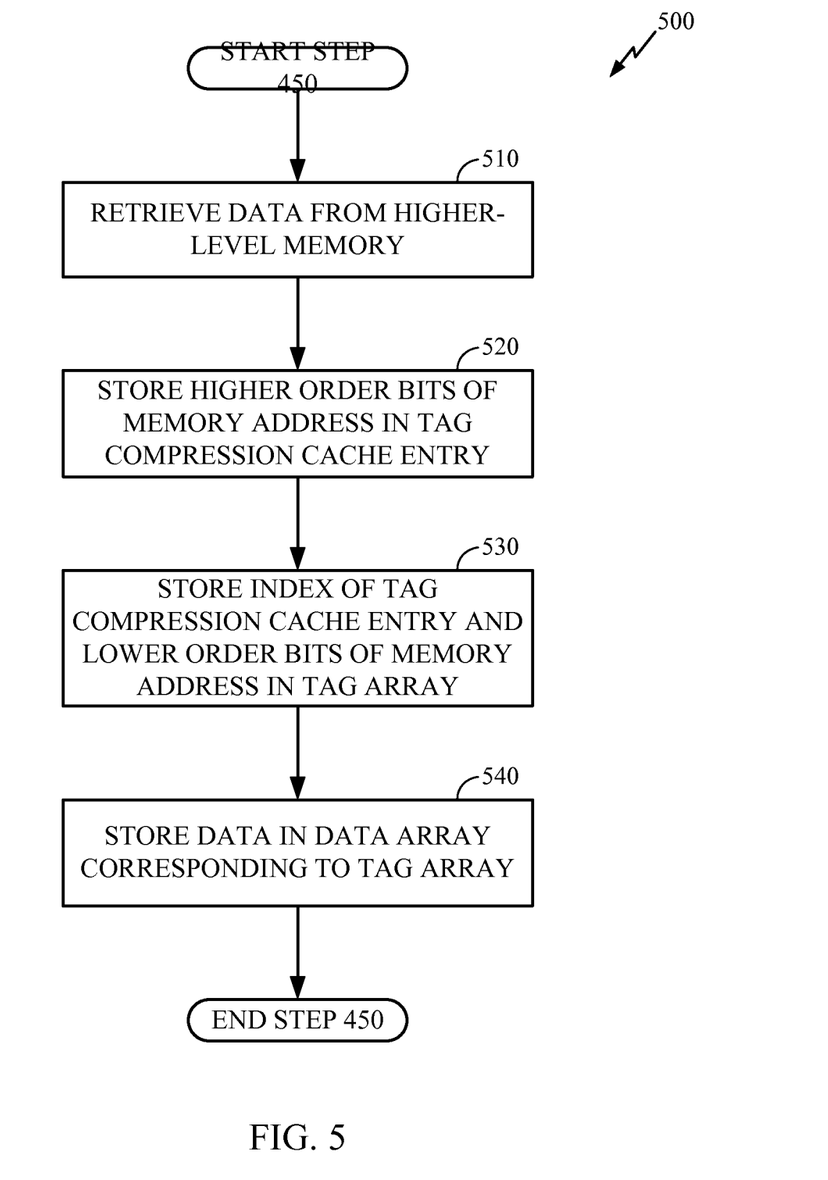
FIG. 5 is a flow chart illustrating a method to establish a new tag compression cache entry, according to one aspect.

FIG. 5 is a flow chart illustrating a method 500 corresponding to step 450 to establish a new entry in the tag compression cache 104, according to one aspect. As shown, the method 500 begins at step 510, where the processor 101 may retrieve the data associated with the memory address provided at step 410 from a higher level memory (such as a higher level cache or main memory). At step 520, the cache logic 103 may store the higher order bits (such as bits M+1:N) of the memory address in a first entry of the TCC 104. At step 530, the cache logic 103 may store the index value of the first entry of the TCC 104 and the lower order bits (such as bits 0:M) of the memory address into a first entry of the tag array 105. At step 540, the cache logic 103 may store the data retrieved at step 510 to an entry in the data array 106 corresponding to the first entry of the tag array 105.

Figure 6:
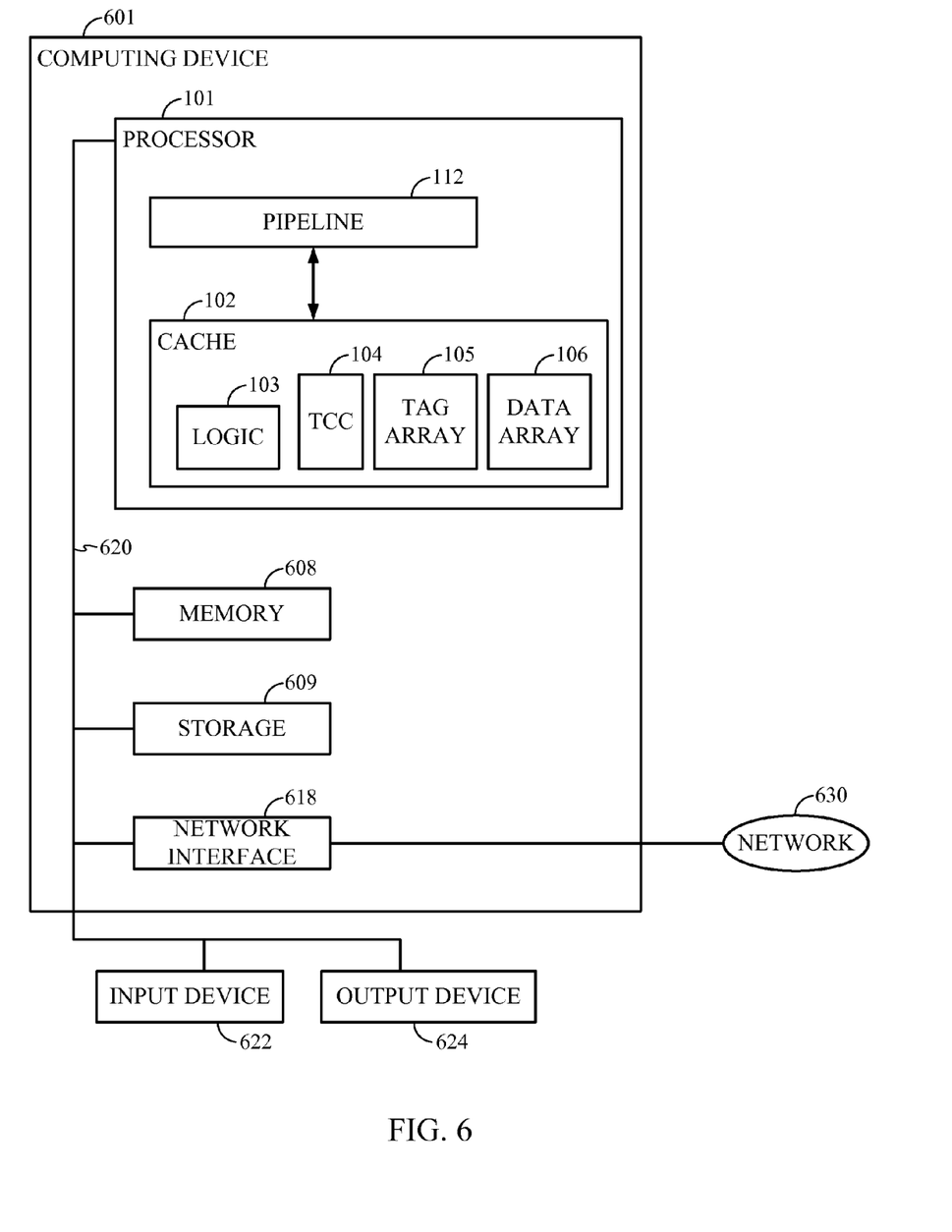
FIG. 6 is a block diagram illustrating a computing device integrating a processor configured to provide cache tag compression, according to one aspect.

FIG. 6 is a block diagram illustrating a computing device 601 integrating the processor 101 configured to provide cache tag compression, according to one aspect. All of the apparatuses and methods depicted in FIGS. 1-5 may be included in or performed by the computing device 601. The computing device 601 may also be connected to other computing devices via a network 630. In general, the network 630 may be a telecommunications network and/or a wide area network (WAN). In a particular aspect, the network 630 is the Internet. Generally, the computing device 601 may be any device which includes a processor configured to implement cache tag compression, including, without limitation, a desktop computer, a laptop computer, a tablet computer, and a smart phone.

The computing device 601 generally includes the processor 101 connected via a bus 620 to a memory 608, a network interface device 618, a storage 609, an input device 622, and an output device 624. The computing device 601 is generally under the control of an operating system (not shown). Any operating system supporting the functions disclosed herein may be used. The processor 101 is included to be representative of a single CPU, multiple CPUs, a single CPU having multiple processing cores, and the like. The network interface device 618 may be any type of network communications device allowing the computing device 601 to communicate with other computing devices via the network 630.

The storage 609 may be a persistent storage device. Although the storage 609 is shown as a single unit, the storage 609 may be a combination of fixed and/or removable storage devices, such as fixed disc drives, solid state drives, SAN storage, NAS storage, removable memory cards or optical storage. The memory 608 and the storage 609 may be part of one virtual address space spanning multiple primary and secondary storage devices.

The input device 622 may be any device for providing input to the computing device 601. For example, a keyboard and/or a mouse may be used. The output device 624 may be any device for providing output to a user of the computing device 601. For example, the output device 624 may be any conventional display screen or set of speakers. Although shown separately from the input device 622, the output device 624 and input device 622 may be combined. For example, a display screen with an integrated touch-screen may be used.

Advantageously, aspects disclosed herein reduce the amount of space required to store memory tag values. By storing redundant values of higher order bits of a memory tag in a smaller tag compression cache, a smaller tag array structure may be used to store the lower order bits of the memory tag. Doing so may allow such structures to be created using a smaller overall silicon die, which lowers manufacturing costs, reduces leakage current, and improves circuit timing by allowing other hardware structures to be placed closer together. In addition, or alternatively, the saved space may be spent on other microarchitectural structures.

A number of aspects have been described. However, various modifications to these aspects are possible, and the principles presented herein may be applied to other aspects as well. The various tasks of such methods may be implemented as sets of instructions executable by one or more arrays of logic elements, such as microprocessors, embedded controllers, or IP cores.

The various operations of methods described above may be performed by any suitable means capable of performing the operations, such as a processor, firmware, application specific integrated circuit (ASIC), gate logic/registers, memory controller, or a cache controller. Generally, any operations illustrated in the Figures may be performed by corresponding functional means capable of performing the operations.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. Some or all such files may be provided to fabrication handlers who configure fabrication equipment using the design data to fabricate the devices described herein. Resulting products formed from the computer files include semiconductor wafers that are then cut into semiconductor die (e.g., the processor 101) and packaged, and may be further integrated into products including, but not limited to, mobile phones, smart phones, laptops, netbooks, tablets, ultrabooks, desktop computers, digital video recorders, set-top boxes and any other devices where integrated circuits are used.

In one aspect, the computer files form a design structure including the circuits described above and shown in the Figures in the form of physical design layouts, schematics, a hardware-description language (e.g., Verilog, VHDL, etc.). For example, design structure may be a text file or a graphical representation of a circuit as described above and shown in the Figures. Design process preferably synthesizes (or translates) the circuits described below into a netlist, where the netlist is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. In another aspect, the hardware, circuitry, and method described herein may be configured into computer files that simulate the function of the circuits described above and shown in the Figures when executed by a processor. These computer files may be used in circuitry simulation tools, schematic editors, or other software applications.

The implementations of aspects disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such aspects.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A cache memory, comprising:
    a tag compression structure storing a plurality of tag compression entries, wherein each of the plurality of tag compression entries contains a respective set of higher order bits of a memory tag and are identified by a respective index value; and
    a tag array storing a plurality of tag array entries, wherein each of the plurality of tag array entries contains a respective set of lower order bits of one of the memory tags and an index value corresponding to one of the index values of the tag compression structure, wherein each memory tag comprises at least a portion of a respective memory address of a data element stored in a data array.

2. The cache memory of claim 1, further comprising logic configured to return an indication of a hit in the tag array for an input memory address by:
    returning the index value corresponding to a first tag compression entry from the tag compression structure upon determining that the set of higher order bits of the memory tag in the first tag compression entry match a set of higher order bits of the input memory address;
    returning the index value and the set of lower order bits of the memory tag stored in a first tag array entry upon determining that the set of lower order bits of the input memory address match the set of lower order bits of the memory tag in the first tag array entry;
    determining that the returned index value of the first tag compression entry matches the returned index value of the first tag array entry; and
    determining that a set of lower order bits of the input memory address match the returned set of lower order bits of the memory tag.

3. The cache memory of claim 1, wherein the cache memory further comprising logic configured to return an indication of a miss in the tag array for an input memory address upon determining at least one of:
    that a set of higher order bits of the input memory address do not match any of the sets of higher order bits in the plurality of tag compression entries;
    that a set of lower order bits of the input memory address do not match any of the sets of lower order bits stored in the plurality of tag array entries; and
    that an index value returned from a tag array entry storing a set of lower order bits that match the lower order bits of the input memory address does not match an index value of a tag compression entry storing a set of higher order bits that match the higher order bits of the input memory address.

4. The cache memory of claim 3, further comprising logic configured to, responsive to returning the indication of the miss in the tag array:
    retrieve a data stored at a next level of a memory hierarchy;
    store the data in a first entry of the data array;
    store a set of higher order bits of the input memory address in a second tag compression entry in the tag compression structure; and
    store: (i) a set of lower order bits of the input memory address, and (ii) an index value corresponding to the second tag compression entry in a second tag array entry of the tag array, wherein the second tag array entry corresponds to the first entry of the data array.

5. The cache memory of claim 1, wherein the entries in the tag compression structure are further configured to store one or more of: (i) an address space identifier (ASID) of a process, (ii) a set of security bits, and (iii) a set of exception level bits.

6. The cache memory of claim 1, wherein a first tag array entry and a second tag array entry each specify an index value corresponding to a first tag compression entry, wherein a set of lower order bits of the second tag array entry do not match a set of lower order bits of the first tag array entry.

7. The cache memory of claim 1, wherein the tag compression structure comprises a fully associative content addressable memory, wherein the tag array comprises a part of at least one of: (i) a data cache, (ii) a translation lookaside buffer, (iii) a line fill buffer, and (iv) an instruction cache.

8. The cache memory of claim 1, wherein the cache memory is disposed in an integrated circuit.

9. A method, comprising:
 storing, in a first tag compression entry of a plurality of tag compression entries in a tag compression structure, a set of higher order bits of a first memory tag, wherein each of the plurality of tag compression entries are identified by a respective index value; and
 storing, in a first tag array entry of a plurality of tag array entries in a tag array, a set of lower order bits of the first memory tag and an index value for the first tag array entry, wherein the index value of the first tag array entry corresponds to the index value of the first tag compression entry in the tag compression structure, wherein the first memory tag comprises at least a portion of a memory address of a data element stored in a data array.

10. The method of claim 9, further comprising returning an indication of a hit in the tag array for an input memory address by:
 returning the index value corresponding to the first tag compression entry from the tag compression structure upon determining that the set of higher order bits of the memory tag in the first tag compression entry match a set of higher order bits of the input memory address;
 returning the index value and the set of lower order bits of the memory tag stored in the first tag array entry upon determining that the set of lower order bits of the input memory address match the set of lower order bits of the memory tag in the first tag array entry;
 determining that the returned index value of the first tag compression entry matches the returned index value of the first tag array entry; and
 determining that a set of lower order bits of the input memory address match the returned set of lower order bits of the memory tag.

11. The method of claim 9, wherein each of the plurality of tag compression entries in the tag compression structure are configured to store a respective set of higher order bits, wherein each of the plurality of tag array entries are configured to store a set of lower order bits of a respective memory tag and an index value corresponding to one of the plurality of tag compression entries, the method further comprising returning an indication of a miss in the tag array for an input memory address upon determining at least one of:
 that a set of higher order bits of the input memory address do not match any of the sets of higher order bits in the plurality of tag compression entries;
 that a set of lower order bits of the input memory address do not match any of the sets of lower order bits stored in the plurality of tag array entries; and
 that an index value returned from a tag array entry storing a set of lower order bits that match the lower order bits of the input memory address does not match an index value of a tag compression entry storing a set of higher order bits that match the higher order bits of the input memory address.

12. The method of claim 11, further comprising:
 responsive to returning the indication of the miss in the tag array:
  retrieve a data stored at a next level of a memory hierarchy;
  store the data in a first entry of the data array;
  store a set of higher order bits of the input memory address in a second tag compression entry in the tag compression structure; and
  store: (i) a set of lower order bits of the input memory address, and (ii) an index value corresponding to the second tag compression entry in a second tag array entry of the tag array, wherein the second tag array entry corresponds to the first entry of the data array.

13. The method of claim 9, wherein the entries in the tag compression structure are further configured to store one or more of: (i) an address space identifier (ASID) of a process, (ii) a set of security bits, and (iii) a set of exception level bits.

14. The method of claim 9, wherein a second tag array entry specifies an index value corresponding to the first tag compression entry, wherein a set of lower order bits of the second tag array entry do not match the set of lower order bits of the first tag array entry.

15. The method of claim 9, wherein the tag compression structure comprises a fully associative content addressable memory, wherein the tag array comprises a part of at least one of: (i) a data cache, (ii) a translation lookaside buffer, (iii) a line fill buffer, and (iv) an instruction cache.

16. A non-transitory computer-readable medium storing instructions that, when executed by a processor, cause the processor to perform an operation comprising:
 storing, in a first tag compression entry of a plurality of tag compression entries in a tag compression structure, a set of higher order bits of a first memory tag, wherein each of the plurality of tag compression entries are identified by a respective index value; and
 storing, in a first tag array entry of a plurality of tag array entries in a tag array, a set of lower order bits of the first memory tag and an index value for the first tag array entry, wherein the index value of the first tag array entry corresponds to the index value of the first tag compression entry in the tag compression structure, wherein the first memory tag comprises at least a portion of a memory address of a data element stored in a data array.

17. The non-transitory computer-readable medium of claim 16, the operation further comprising returning an indication of a hit in the tag array for an input memory address by:
 returning the index value corresponding to the first tag compression entry from the tag compression structure upon determining that the set of higher order bits of the memory tag in the first tag compression entry match a set of higher order bits of the input memory address;
 returning the index value and the set of lower order bits of the memory tag stored in the first tag array entry upon determining that the set of lower order bits of the input memory address match the set of lower order bits of the memory tag in the first tag array entry;
 determining that the returned index value of the first tag compression entry matches the returned index value of the first tag array entry; and
 determining that a set of lower order bits of the input memory address match the returned set of lower order bits of the memory tag.

18. The non-transitory computer-readable medium of claim 16, wherein each of the plurality of tag compression entries in the tag compression structure are configured to store a respective set of higher order bits, wherein each of the plurality of tag array entries are configured to store a set of lower order bits of a respective memory tag and an index value corresponding to one of the plurality of tag compression entries, the operation further comprising returning an indication of a miss in the tag array for an input memory address upon determining at least one of:
  that a set of higher order bits of the input memory address do not match any of the sets of higher order bits in the plurality of tag compression entries;
  that a set of lower order bits of the input memory address do not match any of the sets of lower order bits stored in the plurality of tag array entries; and
  that an index value returned from a tag array entry storing a set of lower order bits that match the lower order bits of the input memory address does not match an index value of a tag compression entry storing a set of higher order bits that match the higher order bits of the input memory address.

19. The non-transitory computer-readable medium of claim 18, the operation further comprising:
  responsive to returning the indication of the miss in the tag array:
    retrieving a data stored at a next level of a memory hierarchy;
    storing the data in a first entry of the data array;
    storing a set of higher order bits of the input memory address in a second tag compression entry in the tag compression structure; and
    storing: (i) a set of lower order bits of the input memory address, and (ii) an index value corresponding to the second tag compression entry in a second tag array entry of the tag array, wherein the second tag array entry corresponds to the first entry of the data array.

20. The non-transitory computer-readable medium of claim 16, wherein the entries in the tag compression structure are further configured to store one or more of: (i) an address space identifier (ASID) of a process, (ii) a set of security bits, and (iii) a set of exception level bits.

21. The non-transitory computer-readable medium of claim 16, wherein a second tag compression entry specifies the index value for the tag array entry, wherein a set of lower order bits stored of a second memory tag stored in the second tag compression entry do not match the set of lower order bits of the first memory tag stored in the first tag compression entry.

22. An apparatus, comprising:
  means for storing, in a first tag compression entry of a plurality of tag compression entries, a set of higher order bits of a first memory tag, wherein each of the plurality of tag compression entries are identified by a respective index value; and
  means for storing, in a first tag array entry of a plurality of tag array entries, a set of lower order bits of the first memory tag and an index value for the first tag array entry, wherein the index value of the first tag array entry corresponds to the index value of the first tag compression entry, wherein the first memory tag comprises at least a portion of a memory address of a data element.

23. The apparatus of claim 22, further comprising means to return an indication of a hit for an input memory address, comprising:
  means for returning the index value corresponding to the first tag compression entry upon determining that the set of higher order bits of the memory tag in the first tag compression entry match a set of higher order bits of the input memory address;
  means for returning the index value and the set of lower order bits of the memory tag stored in the first tag array entry upon determining that the set of lower order bits of the input memory address match the set of lower order bits of the memory tag in the first tag array entry;
  means for determining that the returned index value of the first tag compression entry matches the returned index value of the first tag array entry; and
  means for determining that a set of lower order bits of the input memory address match the returned set of lower order bits of the memory tag.

24. The apparatus of claim 22, wherein each of the plurality of tag compression entries are configured to store a respective set of higher order bits, wherein each of the plurality of tag array entries are configured to store a set of lower order bits of a respective memory tag and an index value corresponding to one of the plurality of tag compression entries, the apparatus further comprising means to return an indication of a miss in the tag array for an input memory address upon determining at least one of:
  that a set of higher order bits of the input memory address do not match any of the sets of higher order bits in the plurality of tag compression entries;
  that a set of lower order bits of the input memory address do not match any of the sets of lower order bits stored in the plurality of tag array entries; and
  that an index value returned from a tag array entry storing a set of lower order bits that match the lower order bits of the input memory address does not match an index value of a tag compression entry storing a set of higher order bits that match the higher order bits of the input memory address.

25. The apparatus of claim 24, further comprising:
responsive to returning the indication of the miss in the tag array:
  means for retrieving a data stored at a next level of a memory hierarchy;
  means for storing the data in a first entry of a data array;
  means for storing a set of higher order bits of the input memory address in a second tag compression entry; and
  means for storing: (i) a set of lower order bits of the input memory address, and (ii) an index value corresponding to the second tag compression entry in a second tag array entry, wherein the second tag array entry corresponds to the first entry of the data array.

* * * * *